United States Patent
Chen et al.

(10) Patent No.: US 10,725,621 B2
(45) Date of Patent: Jul. 28, 2020

(54) ON-SCREEN-DISPLAY (OSD) DRIVING CIRCUIT AND METHOD FOR CONTROLLING OSD OPERATIONS OF A DISPLAY BY USING AN EXTERNAL CURSOR DEVICE

(71) Applicant: Realtek Semiconductor Corp., HsinChu (TW)

(72) Inventors: Yung-Chih Chen, Taipei (TW); Wei-Chih Lin, Taoyuan (TW); Jui-Te Wei, Hsinchu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/168,807

(22) Filed: Oct. 23, 2018

(65) Prior Publication Data

US 2019/0346977 A1    Nov. 14, 2019

(30) Foreign Application Priority Data

May 8, 2018    (TW) .............................. 107115496 A

(51) Int. Cl.
*G06F 3/0482* (2013.01)
*H04N 21/485* (2011.01)
(Continued)

(52) U.S. Cl.
CPC .......... *G06F 3/0482* (2013.01); *G09G 5/006* (2013.01); *H04N 21/431* (2013.01);
(Continued)

(58) Field of Classification Search
CPC ................................. G06F 3/01; G06F 3/041
See application file for complete search history.

(56) References Cited

U.S. PATENT DOCUMENTS 6,333,750 B1 * 12/2001 Odryna ..................... G06F 3/14
345/1.1
8,766,941 B2    7/2014 Pan
(Continued)

FOREIGN PATENT DOCUMENTS

TW    I420833 B    12/2013
TW    I456979 B    10/2014

OTHER PUBLICATIONS

VESA, "Display Data Channel Command Interface (DDC/CI) Standard (formerly DDC2Bi)", Version 1, Aug. 14, 1998.
(Continued)

*Primary Examiner* — Roy P Rabindranath
(74) *Attorney, Agent, or Firm* — Winston Hsu

(57) ABSTRACT

An OSD driving circuit is embedded in the display for controlling OSD operations of the display. The OSD driving circuit has a signal port and a microprocessor. The signal port is coupled to a signal channel for receiving an OSD opening command and for receiving an OSD execution command from a host via the signal channel. The OSD execution command is generated in response to operations of a cursor device of the host, and movement of a cursor displayed on a display panel of the display is controlled by the cursor device. The microprocessor is coupled to the signal port for driving the display panel to display an OSD menu according to the OSD opening command, and for executing OSD operations of the display according to the OSD execution command and coordinates of the cursor.

18 Claims, 5 Drawing Sheets

(51) Int. Cl.
*G09G 5/00* (2006.01)
*H04N 21/431* (2011.01)
(52) U.S. Cl.
CPC ....... *H04N 21/485* (2013.01); *G09G 2320/08* (2013.01); *G09G 2340/12* (2013.01)

(56) References Cited

U.S. PATENT DOCUMENTS

2011/0060987 A1    3/2011   Huang
2014/0218322 A1*   8/2014   Chung .................... G06F 3/041
                                                        345/173
2017/0220135 A1*   8/2017   Abe ...................... G06F 3/0346

OTHER PUBLICATIONS

VESA, "VESA Monitor Control Command Set Standard", Version 2.2a, Jan. 13, 2011.

* cited by examiner

ON-SCREEN-DISPLAY (OSD) DRIVING CIRCUIT AND METHOD FOR CONTROLLING OSD OPERATIONS OF A DISPLAY BY USING AN EXTERNAL CURSOR DEVICE

BACKGROUND OF THE INVENTION

1. Field of the Invention

The present invention is related to an on-screen-display (OSD) driving circuit and a control method thereof, and more particularly to an OSD driving circuit and a control method thereof that can be controlled by an external cursor device.

2. Description of the Prior Art

In general, in order to adjust parameters of a display to implement specific visual effects, a user usually needs to use physical buttons of the display to control an on-screen-display (OSD) menu of the display.

In recent years, displays have included more and more functions, and the structure of the OSD menu has become more and more complicate. In such cases, it is becoming very inconvenient to manipulate the OSD menu by simply using physical buttons of the display. In addition, as the size of the display becomes larger, the distance between the user and the display is gradually increased, and it is inconvenient to perform OSD operations through physical buttons.

SUMMARY OF THE INVENTION

The present invention provides an on-screen-display (OSD) driving circuit and a control method thereof, which facilitates the user to perform OSD operation of the display by an external cursor device.

An embodiment of the present invention discloses a method of controlling OSD operations of a display. The method comprises the display receiving an OSD opening command from a host through a signal channel; the display driving a display panel of the display to display an OSD menu according to the OSD opening command; the display receiving an OSD execution command and coordinates of a cursor on the display panel from the host through the signal channel; and the display performing OSD operations according to the received OSD execution command and the coordinates. The OSD execution command is generated in response to operations of a cursor device of the host, and movement of the cursor on the display panel is controlled by the cursor device.

An embodiment of the present invention discloses an OSD driving circuit disposed in a display for controlling OSD operations of the display. The OSD driving circuit comprises a signal port and a microprocessor. The signal port is coupled to a signal channel and configured to receive an OSD opening command and then receive an OSD execution command from a host through the signal channel. The OSD execution command is generated in response to operations of a cursor device of the host, and movement of a cursor on a display panel of the display is controlled by the cursor device. The microprocessor is coupled to the signal port, configured to drive the display panel of the display to display an OSD menu according to the OSD opening command, and further configured to control the display to perform OSD operations according to the OSD execution command and coordinates of the cursor.

Accordingly, the user may control the OSD operations of the display via the external cursor device so as to adjust the relevant operating parameters of the display.

These and other objectives of the present invention will no doubt become obvious to those of ordinary skill in the art after reading the following detailed description of the preferred embodiment that is illustrated in the various figures and drawings.

DETAILED DESCRIPTION

The present invention provides an on-screen-display (OSD) driving circuit and a control method thereof, and the user can control the OSD operations of the display via an external cursor device (e.g., a computer mouse) to adjust the relevant operating parameters of the display greatly, improving the convenience of the OSD operations.

Figure 1:
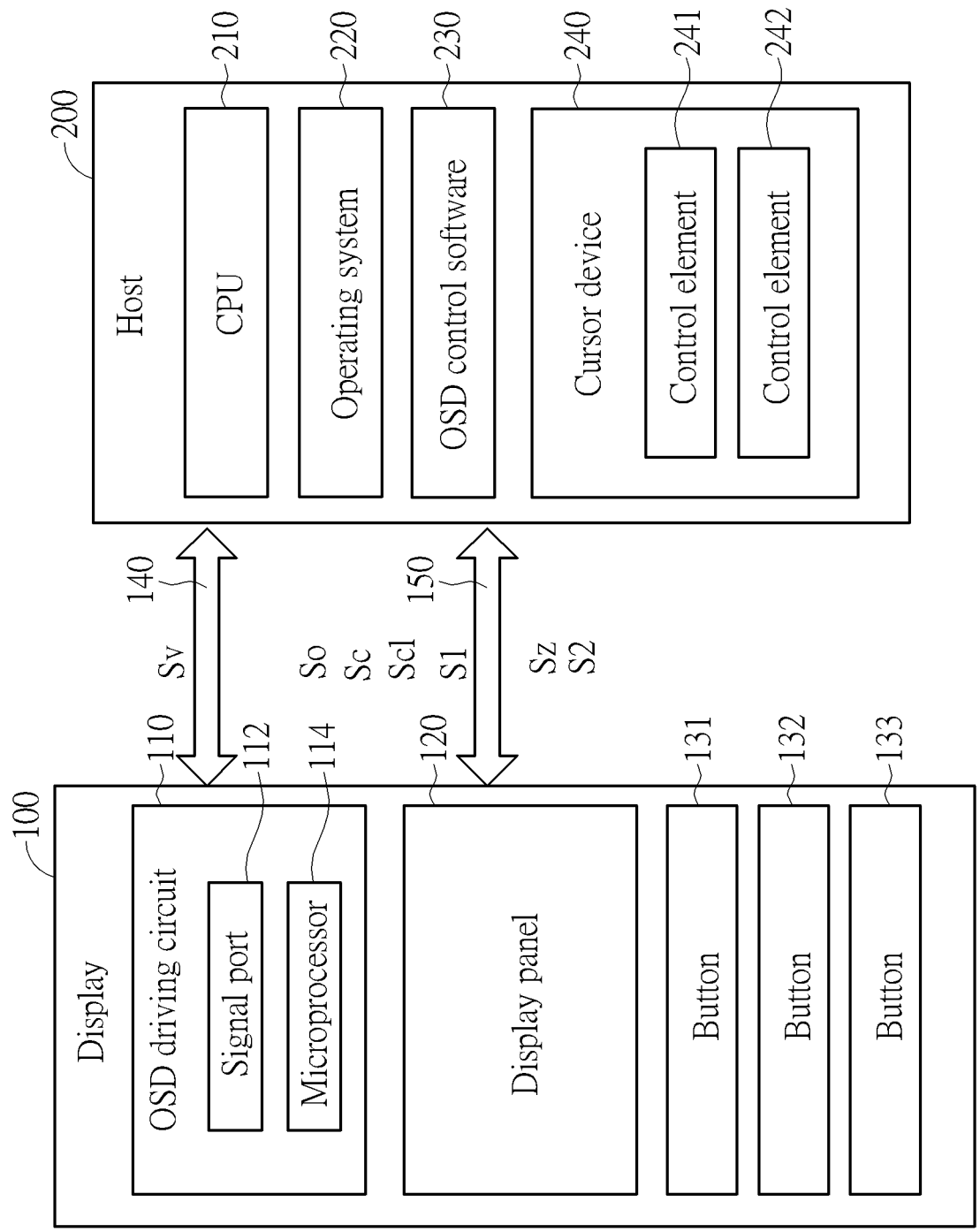
FIG. 1 is a functional block diagram of a display having an OSD driving circuit and a host coupled to the display according to an embodiment of the present invention.

Please refer to FIG. 1. FIG. 1 is a functional block diagram of a display 100 having an on-screen display (OSD) driving circuit 110 and a host 200 coupled to the display 100 according to an embodiment of the present invention. The OSD driving circuit 110 is disposed in the display 100 for controlling the OSD operations of the display 100. The OSD operations of the display 100 provide a visual interface by displaying an OSD menu on a display panel 120 of the display 100, thereby allowing the user to adjust operating parameters of the display 100. The operating parameters of the display 100 may include, but are not limited to, brightness, contrast, saturation, color temperature, gamma value, color gamut, color curve, width of displayed image, length of displayed image, tilt of displayed image, and situational mode.

In this embodiment, the host 200 is a personal computer (such as a desktop personal computer, a notebook computer). The host 200 transmits a video signal Sv to the display 100 through the video channel 140, and the display 100 drives the display panel 120 to display corresponding images according to the received video signal Sv. The video channel 140 may be disposed in a video cable, and the video cable may be selected from a group consisted of a video graphics array (VGA) cable, a digital visual interface (DVI) cable, a high definition multimedia interface (HDMI) cable, and a DisplayPort® cable.

The host 200 comprises a central processing unit (CPU) 210, an operating system (OS) 220, an OSD control software 230, and a cursor device 240. The CPU 210 may be, but is not limited to, a CPU manufactured by companies such as Intel®, AMD®, and NVIDIA®. Further, the OS 220 and the OSD control software 230 are installed in the host 200 and may be executed by the CPU 210. The OS 220 may be, but is not limited to, Windows® operating system of Microsoft®, macOS® operating system of Apple®, and Linux operating system. In addition, the cursor device 240 may be, but is not limited to, a computer mouse, a tracking ball, a joystick, or a touch panel, and the main function of the cursor device 240 is to control movement of a cursor displayed by the display panel 120 and the associated click actions in the OS 220. The cursor device 240 may comprise a plurality of control elements 241 to 242, and the control elements 241 to 242 may be a button, a wheel, or a touch panel. The user may perform operations of clicking, holding, scrolling, sliding, etc. in the environment of the OS 220 via the control elements 241 to 242. In addition, the cursor device 240 may transmit signals to the motherboard of the host 200 in a wired or wireless manner, The CPU 210 is disposed on the motherboard. In a wired manner, the cursor device 240 and the motherboard may be connected by an interface such as a universal serial bus (USB), an RS-232 interface, or a PS/2 interface. In a wireless manner, the cursor device 240 and the motherboard may communicate via a wireless communication interface such as Bluetooth®, Wi-Fi®, or the like.

The OSD driving circuit 110 comprises a signal port 112 and a microprocessor 114. The signal port 112 is coupled to a signal channel 150 for receiving OSD commands (e.g., an OSD opening command So, an OSD execution command Sc1, etc.) from the host 200 through the signal channel 150. In an embodiment of the invention, the signal channel 150 and the video channel 140 are disposed in the same video cable (e.g., VGA, DVI, HDMI, or DisplayPort® cable), and the video cable connects the display 100 to the host 200. If the video cable is a VGA, DVI or HDMI cable, the signal channel 150 may be a display data channel (DDC); if the video cable is a DisplayPort® cable, the signal channel 150 may be an auxiliary (AUX) channel. In another embodiment of the present invention, the signal channel 150 is disposed in a different signal cable than the video cable, and the signal cable is connected between the display 100 and the host 200. The above signal cable may be, but not limited thereto, an RS-232 cable or a USB cable.

Figure 2:
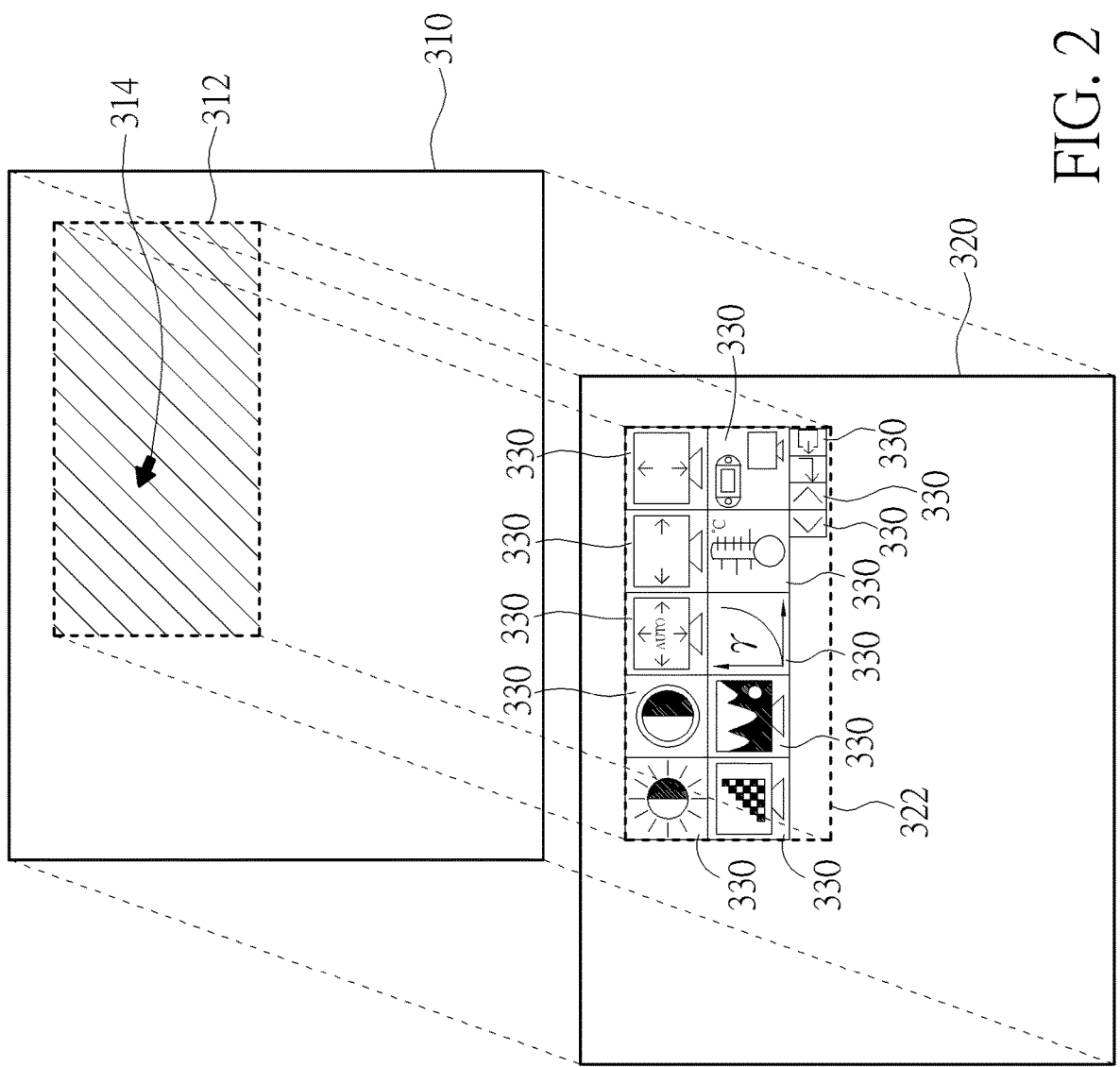
FIG. 2 is a schematic diagram of two graphic layers displayed on a display panel of the display in FIG. 1.

The microprocessor 114 is coupled to the signal port 112 and is configured to drive the display panel 120 of the display 100 to display an OSD menu according to OSD commands to perform OSD operations of the display 100. In order to enable the host 200 to transmit OSD commands to the display 100, in an embodiment of the invention, the OSD control software 230 is installed in the host 200. The OSD control software 230 may be an independent application or an auxiliary program embedded in the driver of the cursor device 240. The main function of the OSD control software 230 is to generate related OSD commands according to the operations of the cursor device 240. The signal channel 150 and the signal port 112 transmit the generated related OSD commands to the OSD driving circuit 110, thereby enabling the OSD driving circuit 110 to control the display 100 to perform corresponding OSD operations in accordance with the received related OSD commands. In order to further explain the functions of the OSD driving circuit 110 and the OSD control software 230, please refer to FIG. 1 and FIG. 2. FIG. 2 is a schematic diagram of two graphic layers displayed on the display panel 120 of the display 100 in FIG. 1. In the embodiment, when the display 100 performs OSD operations, the display panel 120 displays a control window 312 and the OSD menu 322 in two graphic layers 310 and 320 respectively. The graphic layer 310 is the uppermost graphic layer of the graphic layers displayed by the display panel 120. Therefore, when the display panel 120 displays the OSD menu 322 within the graphic layer 310, the OSD menu 322 is not covered by other graphic layers. Moreover, in the embodiment, the OSD menu 322 is a translucent menu, and the control window 312 is displayed within a lower graphic layer 310 below the graphic layer 320 and is completely overlapped by the OSD menu 322. Since the OSD menu 322 is a translucent menu, even if the control window 312 is displayed on the lower graphic layer 310 below the graphic layer 320 and completely covered by the OSD menu 322, the content (e.g., the cursor 314) displayed by the control window 312 can still be seen by the user. In addition, the OSD menu 322 comprises a plurality of OSD options 330, each of which represents an OSD function, such as: brightness, contrast, auto adjustment, length of displayed image, width of displayed image, color gamut, color curve, gamma, color temperature, situation mode, saturation, tilt of displayed image, leaving the OSD menu 322, etc. The user may move the cursor 314 to a corresponding one of the OSD options 330 by using the cursor device 240 and perform a click operation of the cursor device 240 to cause the display 100 to execute an OSD operation corresponding to the OSD option 330 at the position of the cursor 314. For example, when the cursor 314 is moved to the OSD option 330 for adjusting the brightness of the display 100, and the control element 241 of the cursor device 240 is triggered (e.g., clicked), the display 100 performs an operation of adjusting the brightness of displayed images of the display 100.

In addition, it may be further understood that the control window 312 is a blank window of the OS 220 and is opened by the OS 220 in the present embodiment. When the control window 312 is opened, the control window 312 will cover portions of other windows of the OS 220 (if there are other windows) that overlap with the OSD menu 322. Furthermore, the graphic layer 310 where the control window 312 is located is the second upper graphic layer next to the uppermost graphic layer 320 and located between the uppermost graphic layer 320 and other graphic layers. In this manner, when the user controls the cursor 314 by using the cursor device 240 and clicks within the OSD option 330, due to the presence of the control window 312, it is possible to avoid clicking on the window other than the control window 312 in the display area of the OSD menu 322. Therefore, malfunction caused by clicking on other windows may be avoided.

The interactions between the display 100 and the host 200 will be further described below to illustrate how the OSD operations of the display 100 are controlled according to an embodiment of the invention. Please refer to FIG. 1 and FIG. 2 again. In an embodiment of the invention, when the host 200 launches the OSD control software 230, the OSD control software 230 generates an opening command So. The opening command So is transmitted to the signal port 112 through the signal channel 150, so that the microprocessor 114 drives the display panel 120 of the display 100 to display the OSD menu 322 according to the opening command So. Thereafter, the microprocessor 114 transmits information of size Sz of the OSD menu 322 and information of position S2 of the OSD menu 322 displayed on the display panel 120 to the host 200 to cause the OS 220 of the host 200 to open the control window 312 according to the size Sz of the OSD menu 322 and the position S2 of the OSD menu 322 and cause the control window 312 to completely overlap the OSD menu 322. When the OSD menu 322 and the control window 312 are opened, the OSD control software 230 determines whether the display 100 performs any OSD operation within a predetermined time (e.g., ten seconds) after the OSD menu 322 and the control window 312 are opened. If the display 100 does not perform any OSD operation at the predetermined time after the OSD menu 322 and the control window 312 are opened, the OS 220 closes the control window 312, and the OSD control software 230 transmits an OSD closing command Sc through the signal channel 150 to the signal port 112 of the OSD drive circuit 110 to cause the microprocessor 114 to control the display panel 120 to close the OSD menu 322 according to the OSD closing command Sc. On the other hand, when the display panel 120 displays the OSD menu 322 and the control window 312, if the cursor 314 moves to a display area of the control window 312 and a click operation of the cursor device 240 is triggered, the OSD control software 230 generates an OSD execution command Sc1 and transmits the OSD execution command Sc1 and the coordinates S1 of the cursor 314 to the signal port 112 through the signal channel 150, so that the microprocessor 114 controls the display 100 to perform relevant OSD operations according to the OSD execution command Sc1 and the coordinates S1 of the cursor 314. Further, the microprocessor 114 determines whether the display 100 should perform any OSD operation according to the OSD execution command Sc1, and determines which OSD operation the display 100 should perform according to the coordinates S1 of the cursor 314 (that is, determines which OSD option 330 where the cursor 314 is located according to the coordinates S1 of the cursor 314 to perform the OSD operations corresponding to the determined OSD option 330). In this way, after the OSD driving circuit 110 receives the OSD execution command Sc1 and the coordinates S1 of the cursor 314, the OSD driving circuit 110 may control the display 100 to perform the OSD operations corresponding to the OSD option 330 where the cursor 314 is located.

In the above embodiments, the opening command So is generated because the host 200 launches the OSD control software 230, but the present invention is not limited thereto. For example, when the user operates the cursor device 240 in a specific mode, the OSD control software 230 may immediately detect such an operation to generate the opening command So. The specific mode may be, for example, double-clicking another control element 241 of the cursor device 240 when holding the control element 242 of the cursor device 240, continuously holding the control element 242 for three seconds, or other preset operating modes. When the OSD control software 230 transmits the opening command So, the OSD control software 230 simultaneously notifies the OS 220 to open the operation window 312. Similarly, although the OSD closing command Sc, in the above embodiments, is generated by determining whether the display 100 does not perform any OSD operation at the predetermined time after the OSD menu 322 and the control window 312 are opened, the OSD closing command Sc may be generated according to the operations of the cursor device 240. For example, in the case where the OSD menu 322 and the control window 312 are opened, if the user operates the cursor device 240 again in the specific mode described above, the OSD control software 230 generates the OSD closing command Sc. In another embodiment of the present invention, when the user closes the OSD control software 230, the OSD control software 230 generates and transmits the OSD closing command Sc to the OSD drive circuit 110 at a moment before the OSD control software 230 is actually closed. When the OSD control software 230 transmits the OSD closing command Sc, the OSD control software 230 simultaneously notifies the OS 220 to close the operation window 312.

Figure 3:
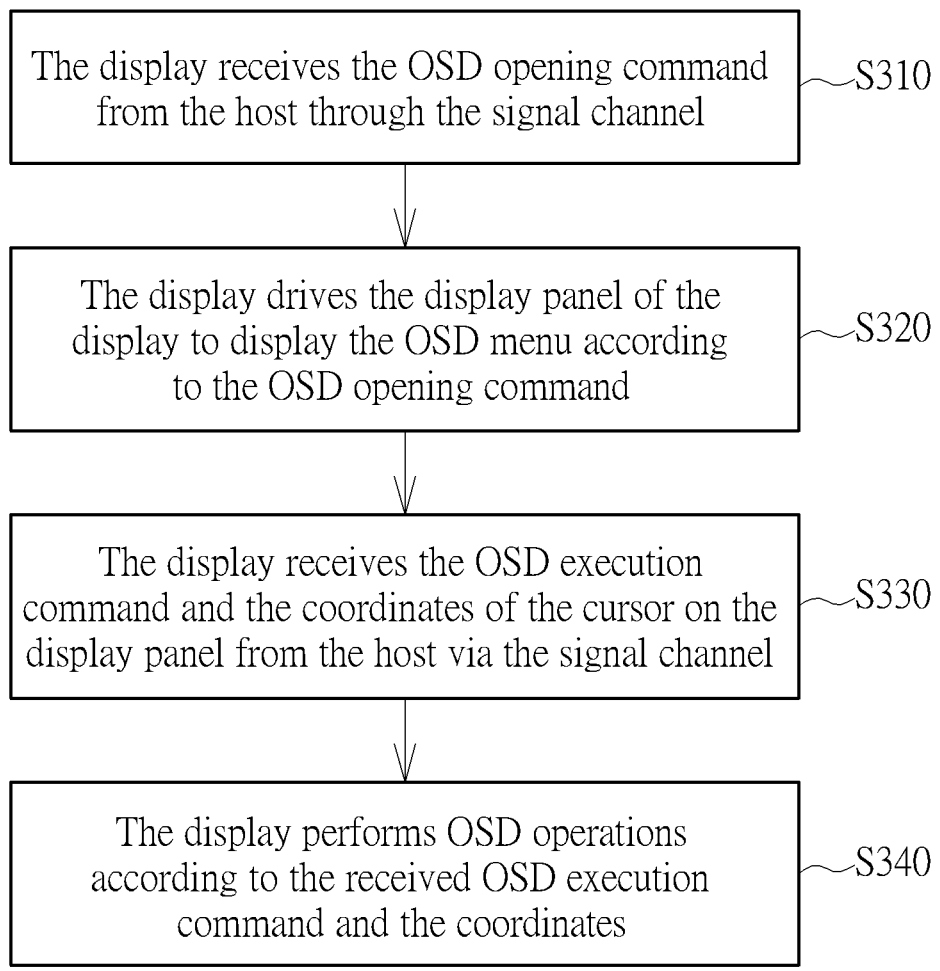
FIG. 3 is a flow chart showing a method of controlling the OSD operations of a display according to an embodiment of the present invention.

In accordance with an embodiment of the present invention, a general flow of a method of controlling the OSD operations of the display 100 may be as shown in FIG. 3. Please refer to FIG. 3. FIG. 3 is a flow chart of a method for controlling OSD operations of a display according to an embodiment of the present invention. The method comprises the following steps:

Step S310: The display 100 receives the OSD opening command So from the host 200 through the signal channel 150;

Step S320: The display 100 drives the display panel 120 to display the OSD menu 322 according to the opening command So;

Step S330: The display 100 receives the OSD execution command Sc1 and the coordinates S1 of the cursor 314 on the display panel 120 from the host 200 via the signal channel 150; and Step S340: The display 100 performs OSD operations of the display 100 according to the received OSD execution command Sc1 and the coordinates S1.

Figure 4:
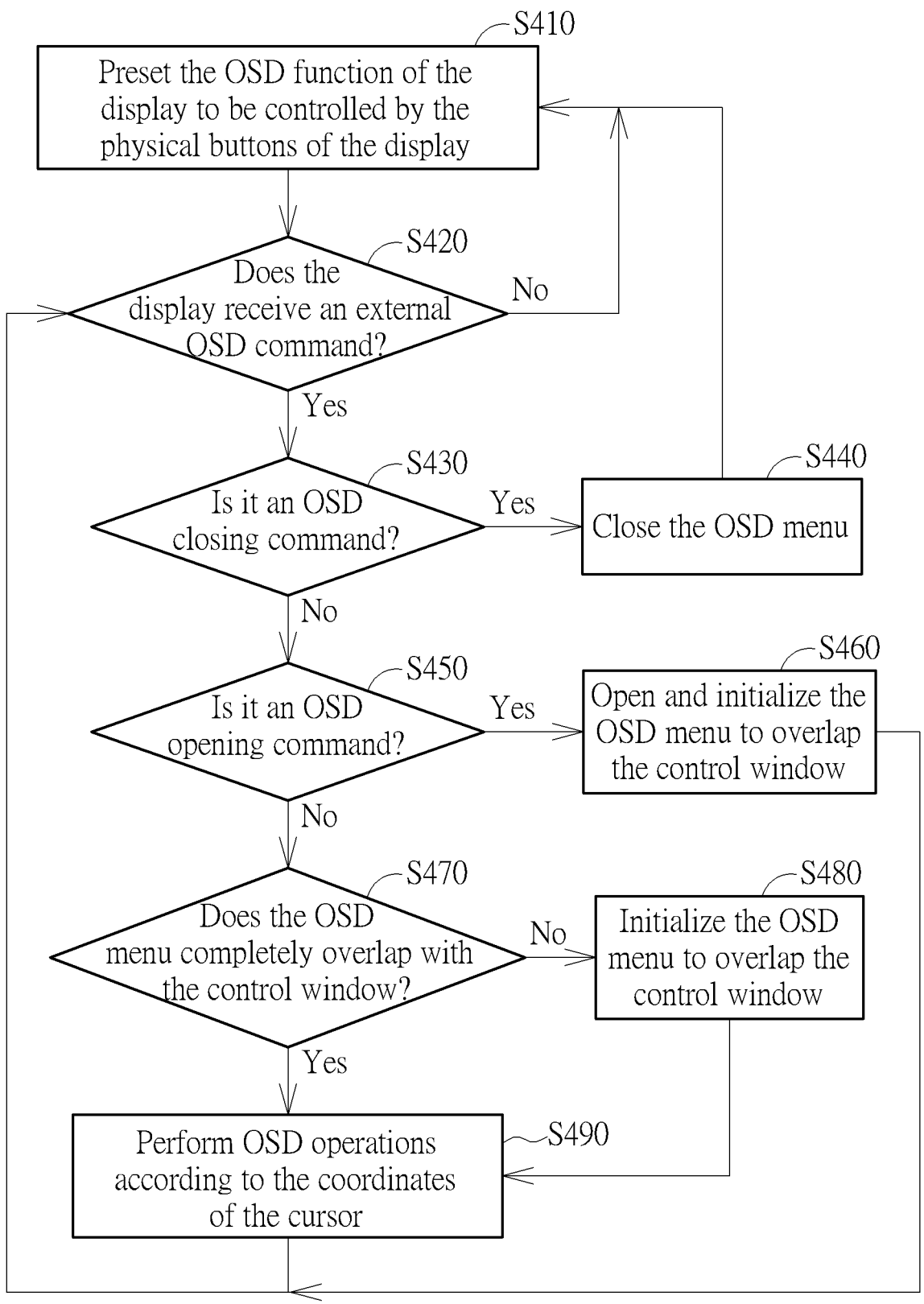
FIG. 4 is a flow chart of the display in FIG. 1 controlling the OSD operations thereof according to an embodiment of the invention.

To further illustrate the method of controlling the OSD operations of the display 100 according to the present invention, the following description will be made in view of the display 100 and the host 200, respectively. In view of the display 100, please refer to FIG. 4. FIG. 4 is a flow chart of the display 100 in FIG. 1 controlling the OSD operations thereof according to an embodiment of the invention. The flow comprises the following steps:

Step S410: The OSD function of the display 100 is preset to be controlled by physical buttons 131 to 133 of the display 100;

Step S420: The microprocessor 114 determines whether an external OSD command (such as the OSD opening command So, the OSD closing command Sc, or the OSD execution command Sc1) is received; if so, step S430 is performed; else steps S410 and S420 are repeated;

Step S430: The microprocessor 114 determines whether the received external OSD command is the OSD closing command Sc; if so, step S440 is performed; else step S450 is performed;

Step S440: In response to the received OSD closing command Sc, the microprocessor 114 controls the display panel 120 to close (i.e., stop displaying) the OSD menu 322;

Step S450: The microprocessor 114 determines whether the received external OSD command is the OSD opening command So; if so, step S460 is performed; else step S470 is performed;

Step S460: The microprocessor 114 controls the display panel 120 to open and initialize the OSD menu 322 to completely overlap with the control window 312;

Step S470: The microprocessor 114 determines whether the OSD menu 322 completely overlaps with the control window 312; if so, step S490 is performed; else step S480 is performed;

Step S480: The microprocessor 114 controls the display panel 120 to initialize the OSD menu 322 to completely overlap the OSD menu 322 with the control window 312; and Step S490: The microprocessor 114 controls the display panel 120 to perform the OSD operations according to the coordinates S1 of the cursor 314 on the display panel 120.

The purpose of initializing the OSD menu 322 is to determine the location of the OSD menu 322 and to make the initialized OSD menu 322 to completely overlap with the control window 312. In detail, when the initialization operation of the OSD menu 322 is performed, the microprocessor 114 determines the position of the OSD menu 322 according to the coordinates S1 of the cursor 314, and determines the size of the control window 312 according to the size of the OSD menu 322, so that the control window 312 has the same size as OSD menu 322 and completely overlaps with OSD menu 322. The purpose of the microprocessor 114 determining the position of the OSD menu 322 according to the coordinates S1 of the cursor 314 is to enable the display area of the OSD menu 322 on the display panel 120 to cover the display area of the cursor 314, thereby allowing the user to use the cursor device 240 to control the OSD operations of the display with a better and more friendly visual and operational experience. In addition, when the microprocessor 114 determines the size of the control window 312 according to the size of the OSD menu 322, the microprocessor 114 transmits information of the size Sz of the OSD menu 322 and information of the position S2 of the OSD menu 322 on the display panel 120 to the host 200, such that the OS 220 of the host 200 opens the control window 312 according to the size Sz of the OSD menu 322 and the position S2 of the OSD menu 322, and that the opened control window 312 and the OSD menu 322 are completely overlapping. In addition, in an embodiment of the present invention, when the display resolution of the display panel 120 is adjusted, the microprocessor 114 also performs an operation of initializing the OSD menu 322. At this time, the OS 220 of the host 200 adjusts the size of the control window 312 according to the adjusted display resolution of the display panel 120, such that the adjusted size of the control window 312 is the same as the size of the OSD menu 322. On the other hand, when the display resolution of the display panel 120 is changed, the microprocessor 114 adjusts the position of the OSD menu 322 on the display panel 120 according to the adjusted display resolution of the display panel 120 and the current coordinates of the cursor 314 on the display panel 120, so that the OSD menu 322 and the control window 312 are completely overlapping. In addition, in another embodiment of the present invention, by the operation of initializing the OSD menu 322, the OSD menu 322 would be completely displayed by the display panel 120 to prevent the OSD menu 322 from being cropped by the edge of the display panel 120.

Figure 5:
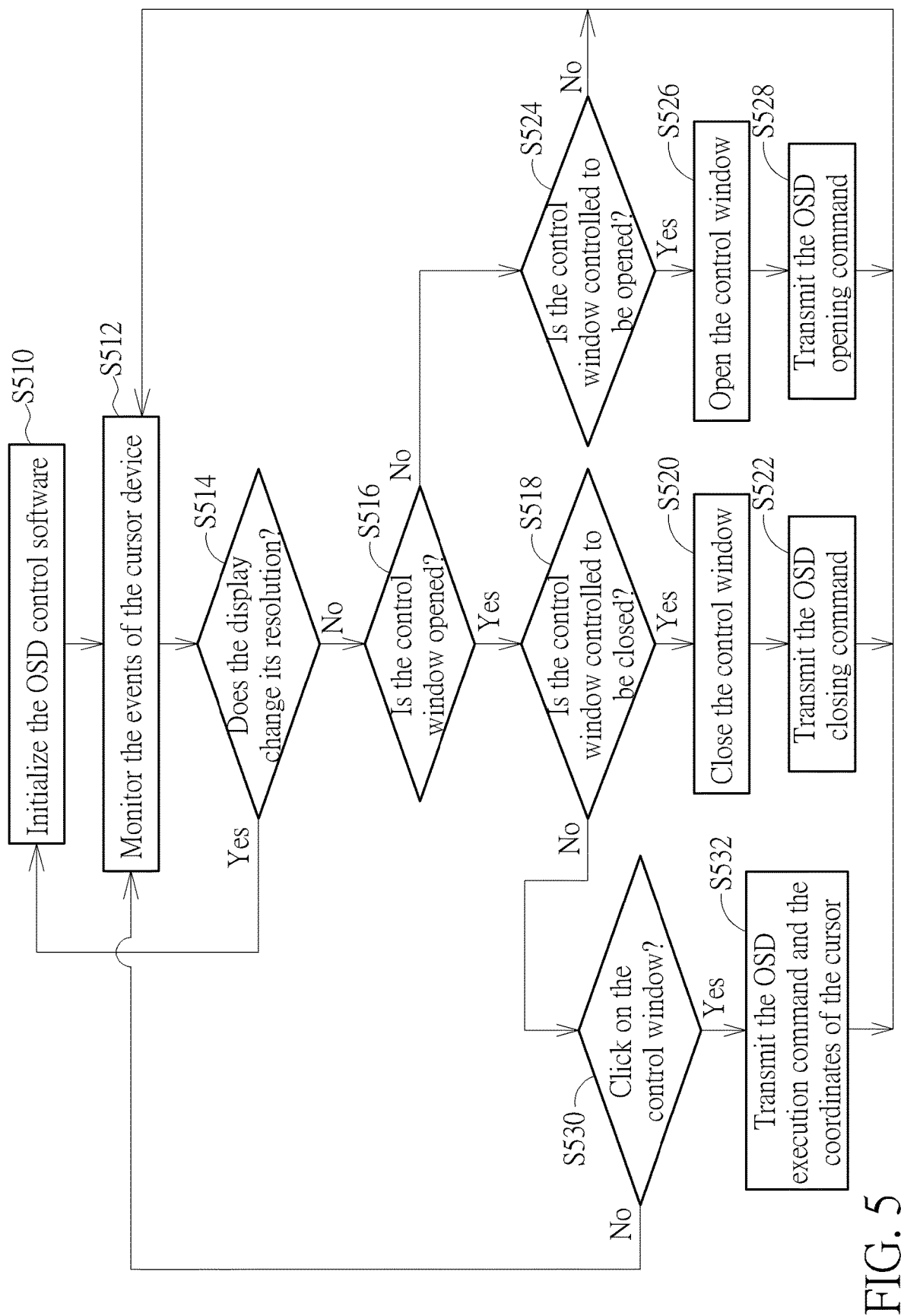
FIG. 5 is a flow chart of the host in FIG. 1 controlling the OSD operations of the display according to an embodiment of the invention.

The following description will be made in view of the host 200. Please refer to FIG. 5. FIG. 5 is a flow chart of the host 200 in FIG. 1 controlling the OSD operations of the display 100 according to an embodiment of the invention. The flow comprises the following steps:

Step S510: The OSD control software 230 is initialized to completely overlap the control window 312 with the OSD menu 322;

Step S512: The OSD control software 230 monitors events of the cursor device 240;

Step S514: The OSD control software 230 determines whether the display resolution of the display 100 is changed; if so, steps S510 and S512 are repeated; else step S516 is performed;

Step S516: The OSD control software 230 determines whether the control window 312 has been opened; if the control window 312 has been opened, step S518 is performed; else step S524 is performed;

Step S518: The OSD control software 230 determines whether the control window 312 is controlled to be closed; if the control window 312 is to be closed, step S520 is performed; else step S530 is performed;

Step S520: The OSD control software 230 notifies the OS 220 to close the control window 312;

Step S522: The OSD control software 230 transmits the OSD closing command Sc to the OSD driving circuit 110 through the signal channel 150 to control the display 100 to close the OSD menu 322;

Step S524: The OSD control software 230 determines whether the control window 312 is controlled to be opened; if the control window 312 is to be opened, step S526 is performed; else step S512 is repeated;

Step S526: The OSD control software 230 notifies the OS 220 to open the control window 312;

Step S528: The OSD control software 230 transmits the opening command So to the OSD drive circuit 110 through the signal channel 150 to control the display 100 to open the OSD menu 322;

Step S530: The OSD control software 230 determines whether the cursor device 240 is clicked while the cursor 314 is located within the control window 312; if so, step S532 is performed; else step S512 is repeated; and Step S532: The OSD control software 230 transmits the OSD execution command Sc1 and the coordinates S1 of the cursor 314 to the OSD driving circuit 110 through the signal channel 150 to control the display 100 to perform corresponding OSD operations according to the coordinates S1 of the cursor 314.

In summary, according to the OSD driving circuit and the control method thereof according to the embodiments of the present invention, the display may receive the OSD execution command and the coordinates of the cursor from the host through the signal channel, so that the microprocessor of the OSD driving circuit may control the display to perform corresponding OSD operations according to the received OSD execution commands and the coordinates of the cursor. Thereby, the user may control the OSD operations of the display via the external cursor device to adjust relevant operating parameters of the display.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling on-screen-display (OSD) operations of a display, the method comprising:
   the display receiving an OSD opening command from a host through a signal channel;
   the display driving a display panel of the display to display an OSD menu according to the OSD opening command;
   the display receiving an OSD execution command and coordinates of a cursor on the display panel from the host via the signal channel, wherein the OSD execution command is generated in response to operations of a cursor device of the host, and movement of the cursor on the display panel is controlled by the cursor device;
   the display transmitting information of size of the OSD menu and position of the OSD menu on the display panel to the host to cause an operating system of the host to open a control window, wherein the OSD menu is a translucent menu, the display panel displays the control window under the OSD menu, and the control window and the OSD menu are completely overlapping; and
   the display performing OSD operations according to the received OSD execution command and the coordinates.

2. The method of claim 1 further comprising:
   adjusting display resolution of the display panel;

adjusting size of the control window according to the adjusted display resolution of the display panel; and adjusting the position of the OSD menu on the display panel according to the adjusted display resolution and current coordinates of the cursor.

3. The method of claim 1, wherein the display drives the display panel to display the OSD menu further according to the coordinates to cause a display area of the OSD menu on the display panel to cover a display area of the cursor.

4. The method of claim 1, wherein the OSD menu comprises a plurality of graphical options, and the display performing OSD operations according to the received OSD execution command and the coordinates comprises:

determining which one of the graphical options the coordinates correspond to; and the display performing OSD operations corresponding to the graphical option determined by the microprocessor.

5. The method of claim 1, wherein the OSD execution command is generated in response to a click operation of the cursor device.

6. The method of claim 1, further comprising:

when the display panel displays the OSD menu, receiving an OSD closing command from the signal channel; and closing the OSD menu according to the OSD closing command.

7. The method of claim 1, wherein the display further receives a video signal from the host through a video cable, the signal channel is disposed in the video cable, and the method further comprises:

driving the display panel to display corresponding images according to the video signal.

8. The method of claim 7, wherein the video cable is selected from a group consisted of a video graphics array (VGA) cable, a digital visual interface (DVI) cable, a high definition multimedia interface (HDMI) cable, and a DisplayPort cable.

9. The method of claim 1, wherein the display is coupled to the host via a signal cable, the signal channel is disposed in the signal cable, the display receives a video signal from the host via a video cable different from the signal cable, and the display controls the display panel to display corresponding images according to the video signal.

10. An on-screen-display (OSD) driving circuit, disposed in a display for controlling OSD operations of the display and comprising:

a signal port, coupled to a signal channel and configured to receive an OSD opening command and then receive an OSD execution command from a host via the signal channel, wherein the OSD execution command is generated in response to operations of a cursor device of the host, and movement of a cursor on a display panel of the display is controlled by the cursor device; and a microprocessor, coupled to the signal port, configured to drive the display panel of the display to display an OSD menu according to the OSD opening command, and further configured to control the display to perform OSD operations according to the OSD execution command and coordinates of the cursor and to transmit information of size of the OSD menu and position of the OSD menu on the display panel to the host to cause an operating system of the host to open a control window, wherein the OSD menu is a translucent menu, the display panel displays the control window under the OSD menu, and the control window and the OSD menu are completely overlapping.

11. The OSD driving circuit of claim 10, wherein when display resolution of the display panel is adjusted, the host adjusts size of the control window according to the adjusted display resolution, and the microprocessor adjusts the position of the OSD menu on the display panel according to the adjusted display resolution and current coordinates of the cursor.

12. The OSD driving circuit of claim 10, wherein the microprocessor drives the display panel to display the OSD menu further according to the coordinates to cause a display area of the OSD menu on the display panel to cover a display area of the cursor.

13. The OSD driving circuit of claim 10, wherein the OSD menu comprises a plurality of graphical options, the microprocessor determines which one of the graphical options the coordinates correspond to, such that the display performs OSD operations corresponding to the graphical option determined by the microprocessor.

14. The OSD driving circuit of claim 10, wherein the OSD execution command is generated in response to a click operation of the cursor device.

15. The OSD driving circuit of claim 10, wherein when the display panel displays the OSD menu, and when the microprocessor receives an OSD closing command from the signal channel, the microprocessor closes the OSD menu according to the OSD closing command.

16. The OSD driving circuit of claim 10, wherein the signal channel is disposed in a video cable, the display receives a video signal from the host through the video cable and drives the display panel to display corresponding images according to the video signal.

17. The OSD driving circuit of claim 16, wherein the video cable is selected from a group consisted of a video graphics array (VGA) cable, a digital visual interface (DVI) cable, a high definition multimedia interface (HDMI) cable, and a DisplayPort cable.

18. The OSD driving circuit of claim 10, wherein the display is coupled to the host via a signal cable, the signal channel is disposed in the signal cable, the display receives a video signal from the host via a video cable different from the signal cable, and the display controls the display panel to display corresponding images according to the video signal.

* * * * *